(12) United States Patent
Iwasa et al.

(10) Patent No.: US 9,048,516 B2
(45) Date of Patent: Jun. 2, 2015

(54) SAFETY DEVICE OF BATTERY TEMPERATURE CONTROL SYSTEM

(75) Inventors: Akio Iwasa, Kumagaya (JP); Akihiko Takano, Kumagaya (JP); Osamu Takahashi, Kumagaya (JP)

(73) Assignee: VALEO JAPAN CO., LTD., Saitama (JP)

( * ) Notice: Subject to any disclaimer, the term of this patent is extended or adjusted under 35 U.S.C. 154(b) by 421 days.

(21) Appl. No.: 13/519,051

(22) PCT Filed: Dec. 7, 2010

(86) PCT No.: PCT/JP2010/072314
§ 371 (c)(1),
(2), (4) Date: Oct. 8, 2012

(87) PCT Pub. No.: WO2011/077980
PCT Pub. Date: Jun. 30, 2011

(65) Prior Publication Data
US 2013/0027882 A1 Jan. 31, 2013

(30) Foreign Application Priority Data

Dec. 25, 2009 (JP) ................................. 2009-294525
Jan. 19, 2010 (JP) ................................. 2010-009366

(51) Int. Cl.
*H01M 10/625* (2014.01)
*B60L 3/00* (2006.01)
(Continued)

(52) U.S. Cl.
CPC ............. *H01M 10/5016* (2013.01); *B60K 1/04* (2013.01); *B60K 11/02* (2013.01);
(Continued)

(58) Field of Classification Search
CPC ............. B60L 3/0046; B60L 11/1874; H01M 10/502; H01M 10/5044; H01M 10/5077; H01M 10/5016
USPC ........................................................ 429/120
See application file for complete search history.

(56) References Cited

U.S. PATENT DOCUMENTS

2005/0167169 A1* 8/2005 Gering et al. ................. 180/65.2
2007/0034352 A1* 2/2007 Lee ................................. 165/58
(Continued)

FOREIGN PATENT DOCUMENTS

EP 2068390 A1 6/2009
JP 07-105988 A 4/1995
(Continued)

OTHER PUBLICATIONS

English language abstract and machine-assisted English translation for JP 07-105988 extracted from the PAJ database on Nov. 19, 2012, 27 pages.
(Continued)

*Primary Examiner* — Muhammad Siddiquee
(74) *Attorney, Agent, or Firm* — Howard & Howard Attorneys PLLC

(57) ABSTRACT

To provide a safety device of a battery temperature control system for an EV or an HEV capable of preventing an electric shock due to the electrical conduction across terminals of batteries in the event of a vehicle collision.

A safety device used in a temperature control system of a battery for a vehicle, including a first heat exchange unit (1) which includes a first heat exchange section (2) filled with a liquid-state heat medium into a pipe (3) and exchanging heat with a battery (B) by the heat medium, and a second heat exchange unit (20) which includes a second heat exchange section (21) heating or cooling the heat medium subjected to heat exchange in the first heat exchange section (2), wherein the heat medium existing in the first heat exchange section is discharged to the outside of the first heat exchange section, for example, under a predetermined condition such as a vehicle collision.

8 Claims, 17 Drawing Sheets

(51) Int. Cl.
    *B60L 11/18*     (2006.01)
    *H01M 10/63*     (2014.01)
    *H01M 10/655*     (2014.01)
    *H01M 10/6568*     (2014.01)
    *B60K 1/04*     (2006.01)
    *B60K 11/02*     (2006.01)
    *B60K 1/00*     (2006.01)
    *H01M 10/6569*     (2014.01)

(52) U.S. Cl.
    CPC ........ *B60K 2001/005* (2013.01); *B60L 3/0046* (2013.01); *B60L 11/1874* (2013.01); *B60L 2240/36* (2013.01); *H01M 10/502* (2013.01); *H01M 10/5044* (2013.01); *H01M 10/5077* (2013.01); *Y02T 10/7005* (2013.01); *Y02T 10/705* (2013.01); *H01M 2200/00* (2013.01); *H01M 10/5079* (2013.01)

(56) References Cited

U.S. PATENT DOCUMENTS

| | | | | |
|---|---|---|---|---|
| 2008/0251235 | A1* | 10/2008 | Zhou | 165/41 |
| 2009/0142653 | A1 | 6/2009 | Okada et al. | |
| 2009/0280395 | A1* | 11/2009 | Nemesh et al. | 429/62 |
| 2011/0111269 | A1* | 5/2011 | Tse | 429/50 |

FOREIGN PATENT DOCUMENTS

| | | |
|---|---|---|
| JP | 09-074603 A | 3/1997 |
| JP | 2003-346924 A | 12/2003 |
| JP | 2007-008411 A | 1/2007 |
| JP | 2009-134901 A | 6/2009 |
| JP | 2009-134936 A | 6/2009 |

OTHER PUBLICATIONS

English language abstract and machine-assisted English translation for JP 09-074603 extracted from the PAJ database on Nov. 19, 2012, 36 pages.

English language abstract and machine-assisted English Translation for JP 2003-346924 extracted from the PAJ database on Nov. 19, 2012, 21 pages.

English language abstract and machine-assisted English Translation for JP 2007-008411 extracted from the PAJ database on Nov. 19, 2012, 36 pages.

English language abstract for JP 2009-134901 extracted from the espacenet.com database on Nov. 19, 2012, 22 pages.

English language abstract for JP 2009-134936 extracted from the espacenet.com database on Nov. 19, 2012, 22 pages.

International Search Report for Application No. PCT/JP2010/072314 dated Mar. 8, 2011.

* cited by examiner

SAFETY DEVICE OF BATTERY TEMPERATURE CONTROL SYSTEM

RELATED APPLICATIONS

This application is the National Stage of International Patent Application No. PCT/JP2010/072314, filed on Dec. 7, 2010, which claims priority to and all the advantages of Japanese Patent Application No. JP 2009-294525, filed on Dec. 25, 2009 and Japanese Patent Application No. JP 2010-009366, filed on Jan. 19, 2010.

TECHNICAL FIELD

The present invention relates to a safety device of a battery temperature control system which is mounted on an electrical vehicle or a hybrid electrical vehicle.

BACKGROUND ART

A plurality of batteries are mounted on an electrical vehicle (hereinafter, referred to as an 'EV') or a hybrid electrical vehicle (hereinafter, referred to as an 'HEV'), and accumulates electrical power for driving a vehicle running motor. Then, a temperature control device is additionally installed for these batteries with a view to removing heat generated from the batteries when charging the batteries and to maintaining a temperature range where electrical power is obtained with high efficiency.

As a state in which the batteries are charged and the heat generated therefrom is desired to be removed, there is a case of accumulating electrical power (so-called regenerated energy) obtained from a motor when the running vehicle is about to stop in addition to the case of replenishing electrical power to the batteries having a small amount of the accumulated electrical power due to the consumption by the running of the vehicle. On the contrary, in a case where the thermal condition around the vehicle is low such as in winter or the like, there is a case in which the batteries need to be warmed so as to obtain electrical power with high efficiency in a running mode. In this way, it is desirable that the temperature control device be designed to exhibit its original function not only in a vehicle stopping mode as in the case of replenishing electrical power to the batteries, but also in a vehicle running mode.

It should be noted that there is a tendency that the charging rate per unit of time when replenishing electrical power increases due to a demand for shortening the electrical power replenishing time in addition to an increase in accumulated electrical power amount for the purpose of extending a running distance. For this reason, the amount of heat generated from the batteries increases when charging the batteries, the battery becomes hot, and the charging efficiency degrades or the lifetime of the batteries is shortened. With such circumstances, there has been a demand for ensuring and improving the cooling performance of the temperature control device.

For this type of temperature control device of the battery, a water cooling type and an air cooling type are known, but from the viewpoint that the high heat exchange rate per unit of time with respect to the batteries can be obtained, the water cooling type cooling device has been gaining more attention (as the water cooling type, see Patent Document 1 below).

Furthermore, there has been proposed a refrigerant using system such as a heat pump cycle or a cooling cycle for an air-conditioner is addition to the water cooling type and the air cooling type. However, there is a need to facilitate the work of replacing the battery and the temperature control device in order to deal with the degradation or the failure of the battery, but the work of replacing the refrigerant is complex and the leakage of the collected refrigerant during the replacing work leads to the destruction of the environment. For these reasons, generally the refrigerant using system is not used.

Further, as the battery for the running of the vehicle, lithium, nickel hydrogen, and sodium-sulfur batteries have been developed. However, different from the conventional battery for the internal combustion engine, these batteries are used with the specification of, for example, a high voltage of 100 V or 350 V. Accordingly, it is essential to consider a method of preventing an electric shock accident in order to prevent a driver a passenger or a rescuer from being electrically shocked in the event of an accident in the EV or the HEV.

In the past, for the above-described electric shock preventing measures, there is known a method of detecting an impact generated in the event of a vehicle collision and breaking a battery circuit or changing wiring of the battery circuit so as to be maintained at a low voltage, or a method of detecting an impact generated in the event of a vehicle collision and injecting a chemical agent such as a cooling agent a neutralizing agent, an absorbing agent, or a fire extinguishing agent toward the battery so as to prevent the scattering of battery electrolyte produced by the damage of the battery itself (for the latter method, see Patent Document 2 below).

PRIOR ART DOCUMENTS

Patent Documents

Patent Document 1: Japanese Patent Application Laid-Open No. H07-105988
Patent Document 2: Japanese Patent Application Laid-Open No. H09-074603

SUMMARY OF THE INVENTION

Problems to be Solved by the Invention

In the above-described related art, when the battery cooling device is damaged due to the impact generated in the event of the vehicle collision of the EV or the HEV, and the battery electrolyte or the chemical agent scatters and enters between the terminals of the battery so that the terminals become electrically conductive, whereby the driver, the passenger or the rescuer is electrically shocked, it has been difficult to avoid the problem which is caused by the liquid use system of the water cooling type cooling device.

Therefore, it is an object of the invention to provide a safety device of a battery temperature control system for the EV or the HEV capable of preventing an electric shock caused by the electrical conduction across terminals of a battery in the event of a vehicle collision in a liquid use system of this type of battery cooling device.

Means for Solving the Problems

According to the invention of claim 1, a safety device of a battery temperature control system is comprising a first heat exchange unit which includes a first heat exchange section filled with a liquid-state heat medium into a pipe and exchanging heat with a battery by the heat medium, and a second heat exchange unit which includes a second heat exchange section heating or cooling the heat medium subjected to heat exchange in the first heat exchange section.

Wherein the heat medium existing in the first heat exchange section is discharged to the outside of the first heat exchange section under a predetermined condition.

According to the invention of claim 2, the safety device of the battery temperature control system according to claim 1, wherein the first heat exchange unit includes a heat medium storage portion and a pump circulating the heat medium of the heat medium storage portion within the pipe.
Wherein when the battery is charged, the pump is operated so as to circulate the heat medium within the pipe, and
Wherein when the battery is not charged, the heat medium existing in at least the first heat exchange section is discharged to the outside of the first heat exchange section.

According to the invention of claim 3, the safety device of the battery temperature control system according to claim 2, wherein the heat medium storage portion is disposed at a location lower than the first heat exchange section, and
Wherein when the battery is not charged, the heat medium existing in the first heat exchange section is discharged from the first heat exchange section to the heat medium storage portion.

According to the invention of claim 4, the safety device of the battery temperature control system according to claim 2, wherein an atmosphere communication port is provided at the upper portion of the first heat exchange unit, and the heat medium storage portion is disposed at a location lower than the first heat exchange section, and
Wherein when the battery is not charged, the heat medium existing in the first heat exchange section is discharged from the first heat exchange section to the heat medium storage portion.

According to the invention of claim 5, the safety device of the battery temperature control system according to any one claims 2 to 4, wherein the first heat exchange section of the first heat exchange unit is connected to the second heat exchange section by a pipe, a three-way valve is provided in the connected pipe, one side of the three-way valve is provided with a pipe having a first opening directed toward the heat medium storage portion, a pipe having a second opening directed toward the heat medium storage portion is provided in either the upstream or the downstream portion of the three-way valve so as to branch the pipe, and an opening and closing valve is provided in the vicinity of the second opening.

According to the invention of claim 6, the safety device of the battery temperature control system according to any one of claims 2 to 5, wherein the heat medium storage portion is detachably mounted.

According to the invention of claim 7, the safety device of the battery temperature control system according to claim 1, further comprising a collision detecting unit which detects an impact generated in the event of a vehicle collision and generates an impact signal;
a compressed gas supply device which is connected to the pipe of the first heat exchange unit and discharges a compressed gas into the pipe when the impact signal is generated; and
a discharge portion which is connected to the pipe of the first heat exchange unit and is able to discharge the heat medium charged into the pipe to the outside of the pipe, wherein when the collision detecting unit detects an impact, the heat medium existing in the first heat exchange section is discharged from the discharge portion to the outside of the pipe by the compressed gas discharged from the compressed gas supply device.

According to the invention of claim 8, the safety device of the battery temperature control system according to claim 7, wherein the compressed gas supply device is disposed on the upstream side of the first heat exchange section, and the discharge portion is disposed on the downstream side of the first heat exchange section.

According to, the invention of claim 9, the safety device of the battery temperature control system according to claim 7, wherein the discharge portion is a pressure valve which is opened when the inner pressure of the pipe exceeds a predetermined value, and by this opening operation, the heat medium is discharged to the outside of the pipe.

According to the invention of claim 10, the safety device of the battery temperature control system according to claim 7, wherein the discharge portion is an electromagnetic valve which is opened when the impact signal is generated, and by this opening operation, the heat medium is discharged to the outside of the pipe.

According to the invention of claim 11, the safety device of the battery temperature control system according to claim 7, wherein an atmosphere communication port is provided at the upper portion of the first heat exchange unit, an opening and closing valve which open and closes the atmosphere communication port is provided, and further the discharge portion is disposed in least the lower portion of the first heat exchange section, wherein the opening and closing valve is opened after the lapse of a predetermined time from the generation of the impact signal from the collision detecting unit.

Effects of the Invention

According to the invention of claim 1, there is no fear for leakage of the heat medium from the first heat exchange section under a predetermined condition such that the system of the EV or the HEV is damaged due to the collision accident or the like. Accordingly, it is possible to avoid the electric shock accident which may be caused when the heat medium leaks from the first heat exchange section.

According to the invention of claim 2, since the pump is operated so as to circulate the heat medium inside the pipe when the battery is charged, the battery is cooled. Further, since the heat medium is discharged to the outside of the first heat exchange section when the battery is not charged, even in the case where the system of the EV or the HEV is damage due to the collision accident or the like, there is no fear at all for leakage of the heat medium from the first heat exchange section. Accordingly, it is possible to avoid the electric shock accident which may be caused when the heat medium leaks from the first heat exchange section.

Furthermore, before the charging of the battery starts, when the pump is operated the heat medium is suctioned from the heat medium storage portion so as fill an internal path of the temperature control device, that is, the internal path formed by the first heat exchange section, the second heat exchange section, the pump, and the piping connecting them.

According to the invention of claim 3, when the battery is not charged, the heat medium is discharged to the heat medium storage portion disposed at the lower portion in relation to the first heat exchange section even in the case where the system is damaged due to the collision accident or the like, so that there is no fear at all for leakage of the heat medium from the first heat exchange section, thereby the electric shock accident can be avoided.

According to the invention of claim 4, when the battery is not charged, the heat medium flows downward to the heat medium storage portion due to the own weight, and is discharged from the first heat exchange section. At this time, since the atmosphere communication port is provided at the upper portion of the first heat exchange unit, air flows into the first heat exchange unit, so that the downward flow of the heat medium to the heat medium storage portion, is accelerated. Accordingly, even in the case where the system is damaged due to the collision accident or the like, since the heat medium does not exist in the first heat exchange section, there is no fear for leakage of heat medium, and hence the electric shock accident can be avoided.

According to the invention of claim 5, when the battery is charged, the opening 3b of the three-way valve is blocked, the opening and closing valve is blocked, and the pump is operated so as to circulate the heat medium. The heat medium passes through the pump and the second heat exchange section, reaches the first heat exchange section so as to exchange heat with the battery, and reaches the pump again through the three-way valve.

When the battery is not charged, the opening 3b of the three-way valve is opened, the opening and closing valve is opened, and the pump is reversely operated so that the heat medium is caused to flow reversely. Accordingly, the heat medium flows downward to the lower heat medium storage portion, and is discharged from the first heat exchange section. Alternatively, the atmosphere communication port may be separately provided at the upper portion of the first heat exchange unit, air is made to flow into the first heat exchange unit, and the heat medium may be caused to flow downward to the heat medium storage portion.

Before the charging of the battery starts, only the opening 3b of the three-way valve is opened, the opening and closing valve is opened, and the pump is operated. Accordingly, the heat medium may be suctioned from the heat medium storage portion through the opening 3c so as to be charged into the internal path of the temperature control device.

In this way, even in the case where the system is damaged due to the collision accident or the like, since the heat medium does not exist in the first heat exchange section, there is no fear at all for leakage of the heat medium, and hence the electric shock accident can be avoided.

Further, since the first heat exchange unit is provided with the three-way valve and the opening and closing valve, it is possible to form a heat medium circulating cycle within the unit by appropriately opening and closing these opening and closing valves.

According to the invention of claim 6, since the heat medium storage portion is detachably mounted, when it is detached when the battery is not charged, that is, the vehicle runs, it is possible to reduce the weight of the vehicle, and to avoid an unintended sound generated from the heat medium due to the vibration generated when the vehicle runs.

Further, as described above, since the first heat exchange unit is provided with the three-way valve and the opening and closing valve, even when the heat medium storage portion is detached, the circulation cycle of the heat medium inside the unit is not disturbed.

According to the invention of claim 7, when an impact is applied to the vehicle regardless of whether the vehicle stops or runs, the heat medium existing in the first heat exchange section is discharged from the discharge portion to the outside of the pipe due to the compressed gas which is discharged from the compressed gas supply device. Accordingly, even in the case where the system of the EV or the HEV is damaged due to the collision accident or the like, there is no fear for leakage of the heat medium from the first heat exchange section. Accordingly, the electric shock accident, which may be caused when the heat medium leaks from the first heat exchange section, can be avoided.

According to the invention of claim 8, the compressed gas supply device is provided on the upstream side of the first heat exchange section and the discharge portion is provided on the downstream side of the first heat exchange section. Accordingly, it is possible to prevent the heat medium from remaining in the cycle as much as possible, thereby to more reliably avoid the electric shock accident.

According to the invention of claim 9, since the heat medium is pressed by the compressed gas discharged from the compressed gas supply device, the pressure inside the pipe increases. Then, when the pressure inside the pipe exceeds a predetermined value, the pressure valve is opened so that the heat medium existing in the first heat exchange section is discharged from the discharge portion to the outside of the pipe. In this way, the heat medium may be discharged to the outside of the pipe only when the pressure inside the pipe exceeds a predetermined value, thereby it is possible to omit the opening and closing control mechanism of the discharge portion and to simplify the configuration and the control.

According to the invention of claim 10, when the impact signal is generated, the discharge portion which is the electromagnetic valve is opened, so that the heat medium existing in the first heat exchange section is discharged from the discharge portion to the outside of the pipe. In this way, since the discharge portion may be opened, it is possible to more reliably discharge the heat medium.

According to the invention of claim 11, even after the compressed gas is discharged from the compressed gas supply device, the remaining heat medium flows downward in the discharge portion positioned at the lower portion of the first heat exchange section due to the own weight. That is, since the atmosphere communication port is provided at the upper pipe of the first heat exchange unit, air flows into the first heat exchange unit, that is, the pipe, so that the downward flow of the heat medium is accelerated. Accordingly, even when the heat medium remains due to the discharge operation using the compressed gas from the compressed gas supply device, the remaining heat medium may be discharged, and the electric shock accident can be avoided more reliably.

The present invention has such a configuration, and hence even in the case where the system is damaged due to the collision accident or the like, since the heat medium does not exist in the first heat exchange section, there is no fear at all for leakage of the heat medium, so that the electric shock accident can be avoided.

BEST MODE FOR CARRYING OUT THE INVENTION

Hereinafter, the invention will be described based on Embodiment 1 and Embodiment 2, as illustrated Embodiment 1

Figure 1:
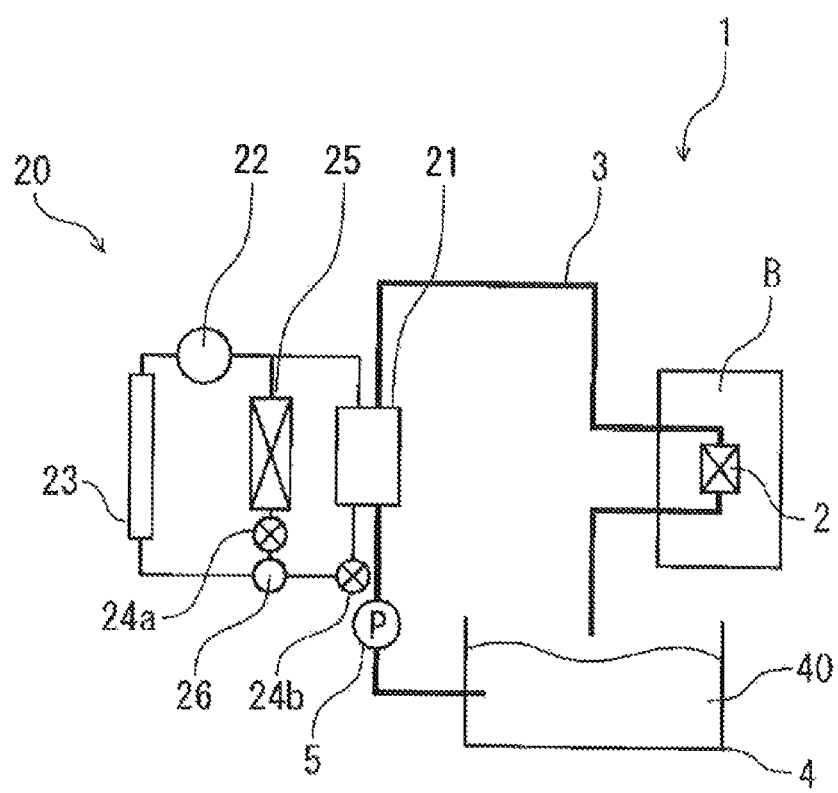
FIG. 1 is an overall structural diagram of the invention. (Embodiment 1)

FIG. 1 is an overall structural diagram illustrating a temperature control device of the present embodiment, where the temperature control device comprises a first heat exchange unit 1 and a second heat exchange unit 20. The first heat exchange unit 1 includes a first heat exchange section 2 which charges a liquid-state heat medium 40 into a pipe 3 and exchanges heat with a battery B by the heat medium 40. The second heat exchange unit 20 includes a second heat exchange section 21 which heats or cools the heat medium 40 subjected to heat exchange in the first heat exchange section 2. Furthermore, for the heat medium, for example, water or an antifreeze liquid is used, but the heat medium is not particularly limited thereto.

The first heat exchange unit 1 includes a heat medium storage portion 4 which is disposed at the downstream side of the first heat exchange section 2 and a pump 5 which circulated the heat medium 40 of the heat medium storage portion 4 within the pipe 3.

In this embodiment, the battery is fast charged by a battery charging stand (not illustrated) or the like. That is, the fast charging of the battery, which is performed in a short time, is performed when the vehicle is stopped, and the temperature of the battery quickly rises. However, in the case of the charging of the battery using a regenerative power generation when the vehicle runs, this is a so-called slow charging, and even when the temperature of the battery rises with the slow charging, the degree of the rising temperature does not cause any problem in the battery.

In the case of the charging of the battery of this embodiment, and especially, the fast charging, the pump 5 is operated so as to circulate the heat medium within the pipe 3, and hence the first heat exchange section 2 exchanges heat with the battery B by the heat medium 40.

Further, in the case of this embodiment, when the battery is not charged, the heat medium 40 which exists in at least the first heat exchange section 2 is discharged from the first heat exchange section.

In this way, according to the temperature control device of the present embodiment, since the pump 5 is operated so as to circulate the heat medium 40 within the pipe 3 when the battery is charged, the battery B is cooled. Further, since the heat medium 40 is discharged to the outside of the first heat exchange section 2 when the battery is not charged, even in a case where the system is damaged due to a collision accident or the like, there is no fear at all for leakage of the heat medium 40 from the first heat exchange section 2. Accordingly, it is possible to avoid an electric shock accident which may be caused when the heat medium leaks from the first heat exchange section.

The second heat exchange unit 20 includes the second heat exchange section 21 as described above, and further includes a compressor 22 which compresses a refrigerant, a condenser 23 which cools the refrigerant compressed in the compressor 22, a depressurizer 24a which depressurizes and expands the refrigerant cooled in the condenser 23, and an evaporator 25 which evaporates the refrigerant depressurized in the depressurizer 24a. Furthermore, the compressor 22 is driven by a motor (not illustrated). Further, for the refrigerant which his used in the second heat exchange unit, Fleon, carbon dioxide, hydrocarbon, or the like is appropriately used.

In FIG. 1, numeral 26 is a switching valve 26, and the temperature control in the second heat exchange section 21 may be performed by the switching of the switching valve 26. Accordingly, since the temperature control of the battery B in the first heat exchange section 2 may be also performed by the temperature control, the temperature of the battery is maintained at an appropriately constant state, so that the efficiency of charging and discharging the battery may be improved.

For example, when the refrigerant, which is discharged from the compressor 22 and passes through the condenser 23, is made to flow into the second heat exchange section 21 by the switching valve 26, the refrigerant may be depressurized in the depressurizer 24b on the upstream side of the second heat exchange section 21, evaporated in the second heat exchange section 21 so as to cool the heat exchange unit 1, and then to be returned to the compressor 22. Furthermore, by appropriately changing the discharge amount of the refrigerant from the compressor 22 or the setting condition of the depressurizer 24b on the upstream side of the second heat exchange section 21, the cooling amount of the first heat exchange unit 1 in the second heat exchange section 21 may be controlled.

Further, if necessary, the refrigerant which is discharged from the compressor 22 and passes through the condenser 23 may be distributed to both the second heat exchange section 21 and the evaporator 25 by the switching valve 26.

In the temperature control device of the battery illustrated in FIG. 1, an example is illustrated in which the upper portion of the heat medium storage portion 4 is opened, but this illustrates the conceptual structure of the device and the invention is not limited thereto. Then, it is needless to mention that the upper portion of the heat medium storage portion 4 is blocked so as to form a so-called circuit (closed loop).

Further, in the temperature control device of the battery of this embodiment, the heat medium storage portion 4 may be disposed at the lower portion in relation to the first heat exchange section 2. Then, when the battery is not charged, the heat medium 40 which exists in the first heat exchange section 2 is discharged from the first heat exchange section to the heat medium storage portion 4. With such a structure, since the heat medium 40 is discharged to the heat medium storage portion when the vehicle runs, even in the case where the system is damaged due to a collision accident or the like, there is no fear at all for leakage of the heat medium 40 from the first heat exchange section and the electric shock accident can be avoided.

Further, in the temperature control device of the battery of this embodiment, the heat medium storage portion 4 may be detachably mounted. That is, since the heat medium 40 is discharged to the outside of the first heat exchange section 2 and is stored in the heat medium storage portion 4 when the battery is not charged, if the heat medium storage portion 4 is detached when the battery is not charged, that is, the vehicle runs, the weight of the vehicle may be reduced. At the same time, unintended sound may be generated from the heat medium due to the vibration when the vehicle runs, and this problem may be also avoided.

Figure 2:
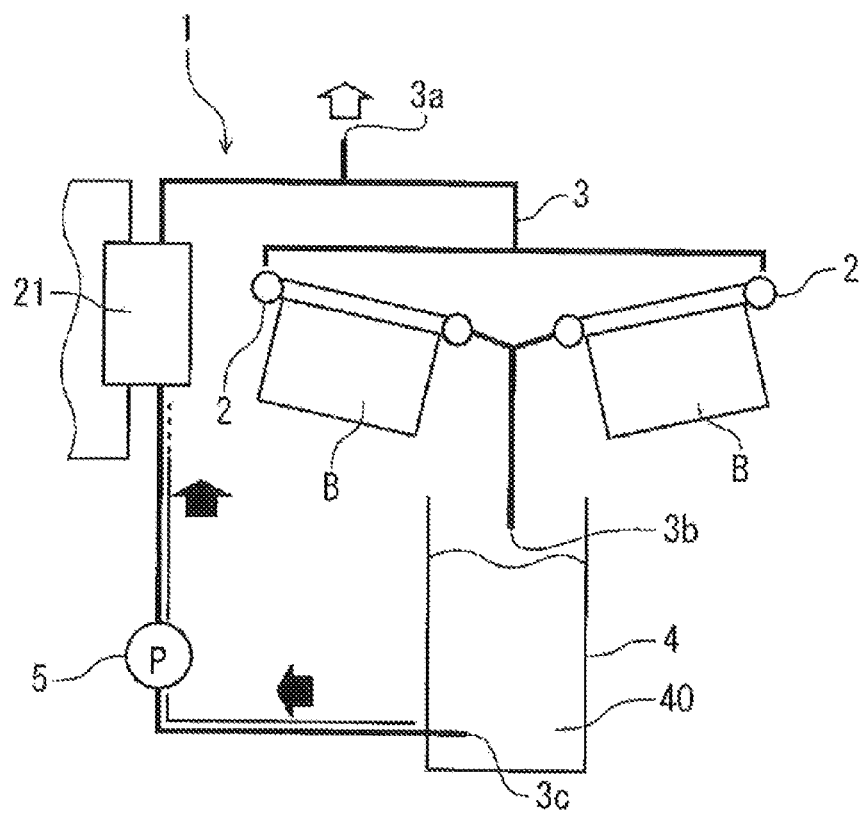
FIG. 2 is a structural diagram illustrating a first heat exchange unit of the invention. (Embodiment 1)
Figure 3:
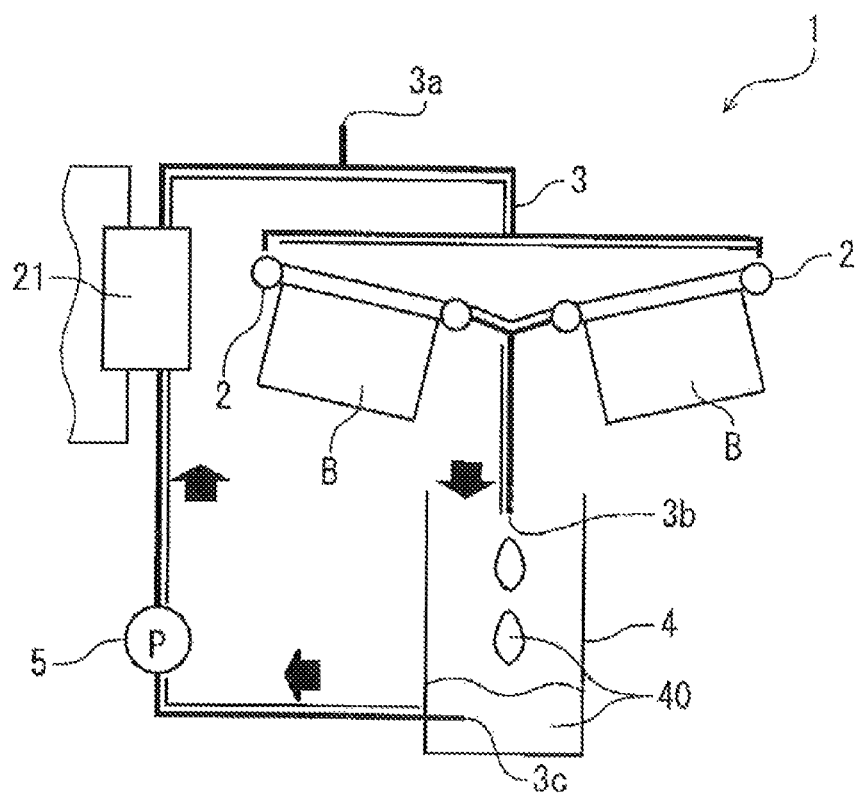
FIG. 3 is a structural diagram illustrating a first heat exchange unit of the invention. (Embodiment 1)
Figure 4:
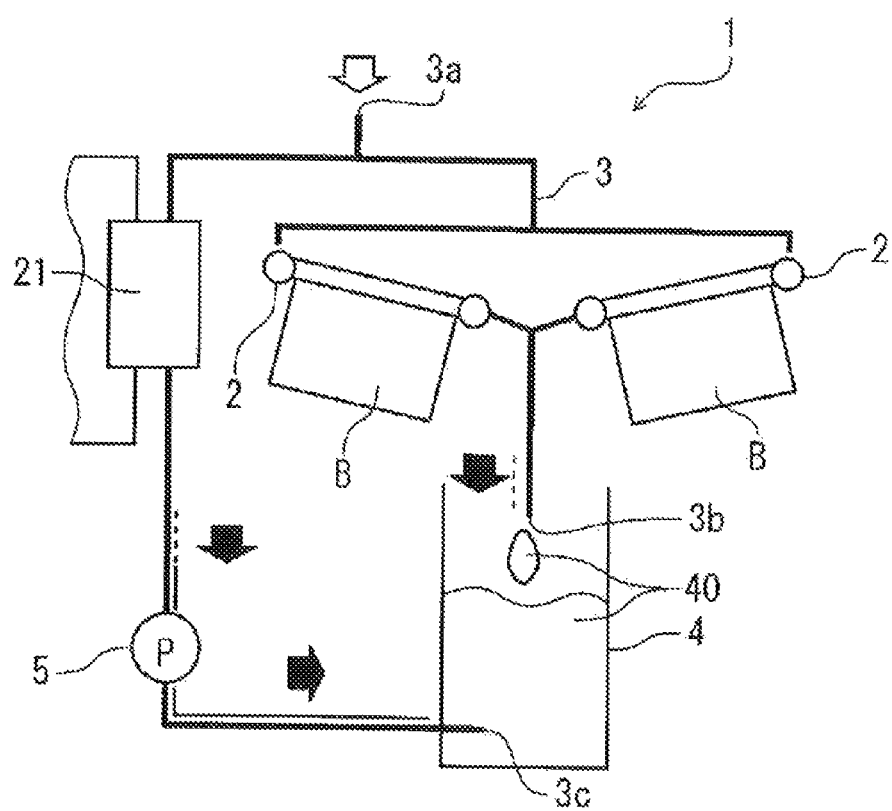
FIG. 4 is a structural diagram illustrating a first heat exchange unit of the invention. (Embodiment 1)

With the temperature control device of the battery illustrated in FIG. 2 to FIG. 4, the atmosphere communication port is installed at the upper portion of the first heat exchange unit 1, and the heat medium storage portion 4 is disposed at the lower portion in relation to the first heat exchange section 2 as in the case of the former embodiment. Then, when the battery is not charged, the heat medium 40 which exists in the first heat exchange section 2 is discharged from the first heat exchange section 2 to the heat medium storage portion 4.

In this embodiment an atmosphere communication port 3a is provided at the uppermost portion of the pipe 3. further, one opening 3b of the pipe 3 is positioned at the upper portion of the heat medium storage portion 4, and the other opening 3c of the pipe 3 is positioned at the lower portion of the heat medium storage portion 4.

Figure 5:
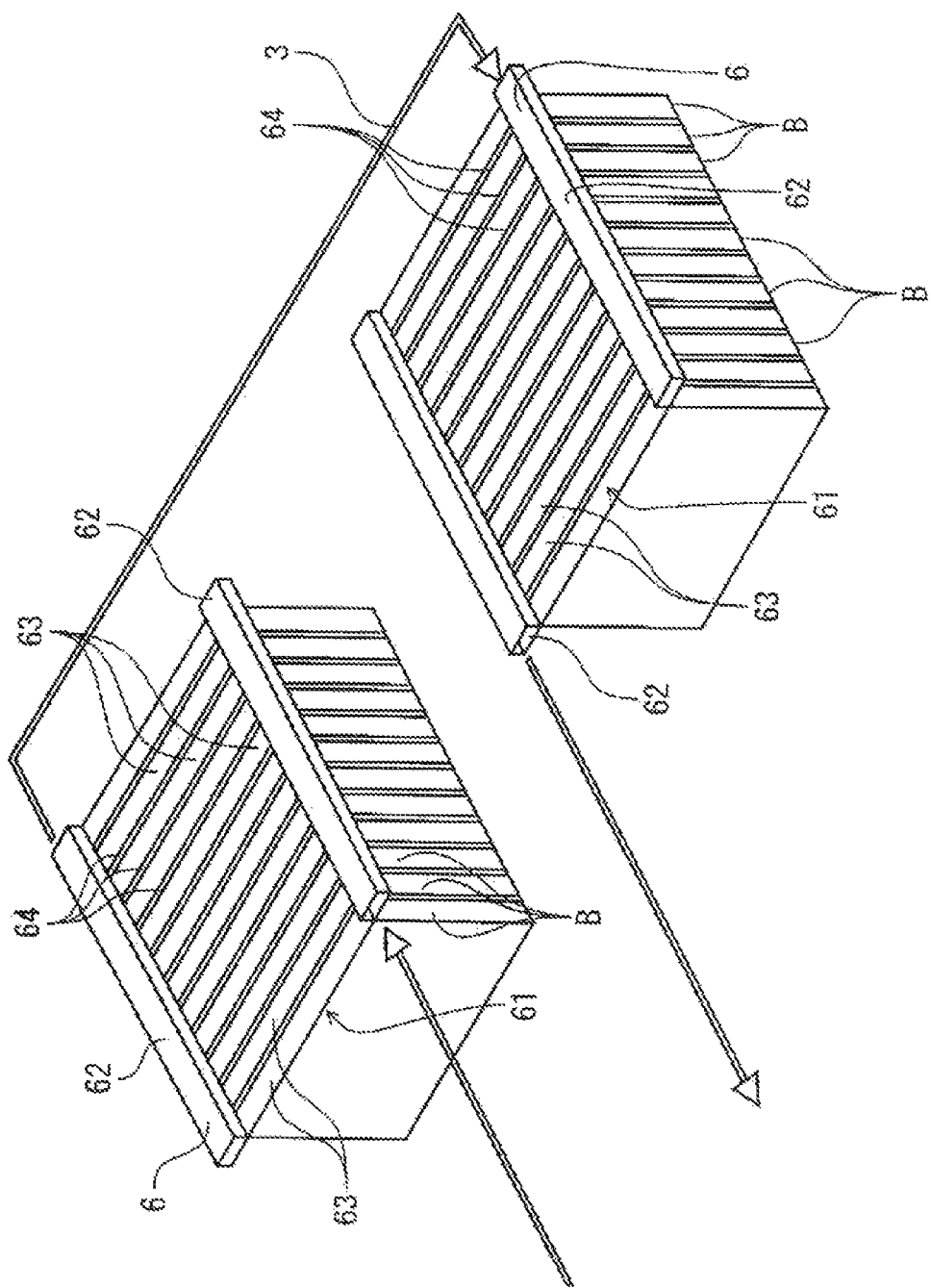
FIG. 5 is a structural diagram illustrating an appearance of a first heat exchange section. (Embodiment 1)
Figure 6:
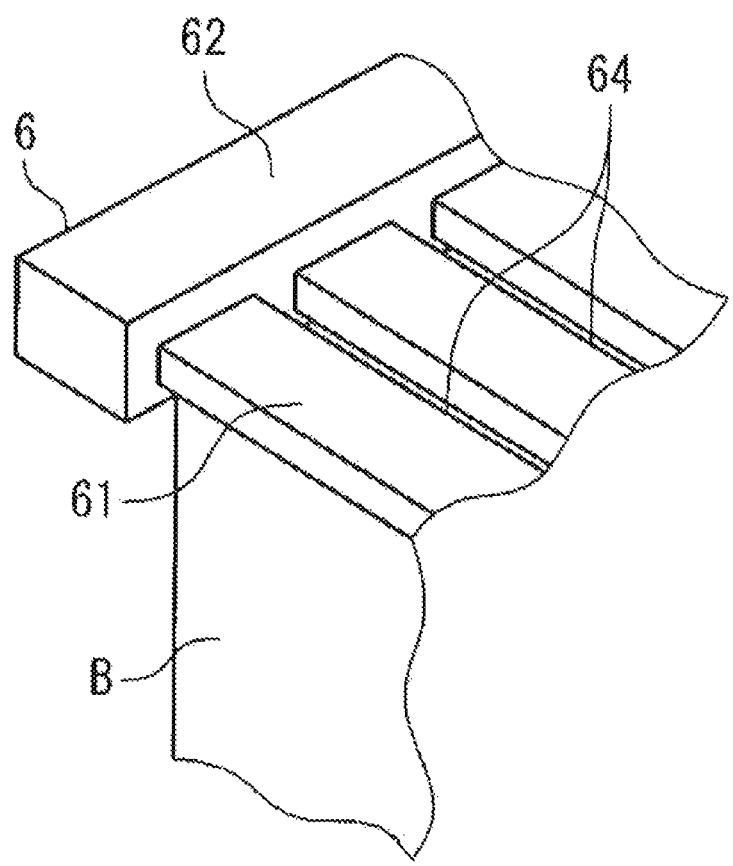
FIG. 6 is a structural diagram illustrating a partially enlarged the first heat exchange section. (Embodiment 1)

As illustrated in FIG. 5 and FIG. 6, the first heat exchange section 2 of this embodiment has a structure in which a heat exchange core 6 is disposed on the top portion of each block formed by vertically arranging a predetermined number of batteries B.

For the heat exchange core 6, aluminum plates 61 and 61 having the identical structure are used, and the heat exchange core is formed by attaching one plate 61 is up-side-down to the other plate 61 through brazing method. The heat exchange core 6 includes a pair of left and right header portions 62 and 62, a plurality of flow passageways 63 and 63 which are provided between the header portions 62 and 62, and partition portions 64 and 64 which are provided between the flow passageways 63 and 63. In this embodiment an aqueous solution is used as the heat medium 40. When the battery is fast charged, the heat medium (aqueous solution) is so configured to flow from one header portion 62 to the other header portion 62 through the flow passageways 63 and 63 as indicated by an arrow mark of FIG. 5.

Further, the respective heat exchange cores 6 are arranged slightly obliquely as illustrated in FIG. 2 to FIG. 4. This is to allow the heat medium flows downward even by the own weight at the time of discharging the heat medium 40 existing in the first heat exchange section 2 to the heat medium storage portion 4 when the battery is not charged as described above.

In the temperature control device of the battery illustrated in FIG. 2 to FIG. 4, the flow of the heat medium 40 is each of the following cases, that is, before the battery is charged, at the time of changing the battery, and when the battery is not charged, is as follows.

Before the battery is charged, as illustrated in FIG. 2, the heat medium 40 is suctioned from the opening 3c of the pipe 3 which is positioned at the lower portion of the heat medium storage portion 4 by the operation of the pump 5, and is introduced into the pipe 3. At this time, the air inside the pipe present in front of the introduced heat medium 40 is discharged from the atmosphere communication port 3a. Then, the heat medium 40 fills the heat exchange core 6, and then fills the path to the opening 3b.

At the time of charging the battery, as illustrated in FIG. 3, the heat medium 40 is cooled in the second heat exchange section 21 of the pipe 3, reaches the first heat exchange section 2 so as to cool the battery B therein, and then is discharged from the opening 3b of the pipe 3 to the heat medium storage portion 4. At this time, the heat medium 40 passes through the pipe 3 in the vicinity of the atmosphere communication port 3a, but the atmosphere communication port 3a is provided at the portion which is further higher by a predetermined distance with request to the uppermost portion through which the heat medium 40 passes in the pipe 3. The liquid level of the heat medium 40 may increase from the pipe 3 toward the atmosphere communication port 3a due to the flowing water resistance of the heat exchange core 6 or the like. However, since the atmosphere communication port is provided at a position away by a predetermined distance, the heat medium 40 may not be discharged from the atmosphere communication port 3a. Furthermore, in order to secure the predetermined distance, a rubber pipe or the like may be further connected to the atmosphere communication port 3a, and the front end of the rubber pipe may be positioned at a further high position.

When the battery is not charged, as illustrated in FIG. 4, the pump 5 is stopped or reversely operated, so that the heat medium 40 on the side of the first heat exchange section 2 is discharged from the opening 3b of the pipe 3 to the heat medium storage portion 4, and the heat medium 40 on the side of the pump 5 is discharged from the opening 3c of the pipe 3 to the heat medium storage portion 4. At this time, since the atmosphere communication port 3a is provided in the upper pipe 3 of the first heat exchange unit 1, air flows into the first heat exchange unit, that is, into the pipe 3, so that the downward flow of the heat medium 40 to the heat medium storage portion 4 is accelerated.

In this way, in the temperature control device of the battery illustrated in FIG. 2 to FIG. 4, even in the case where the system is damaged due to the collision accident or the like of the vehicle, since the heat medium 40 does not exist in the first heat exchange section, there is no fear at all for leakage of the heat medium 40, and the electric shock accident may be avoided. Further, even when the opening and closing valve is not provided in the opening 3b or the opening 3c, the heat medium may be filled into the pipe of the temperature control device, circulated therein, or discharged therefrom, solely by the appropriate control of the pump 5.

Figure 7:
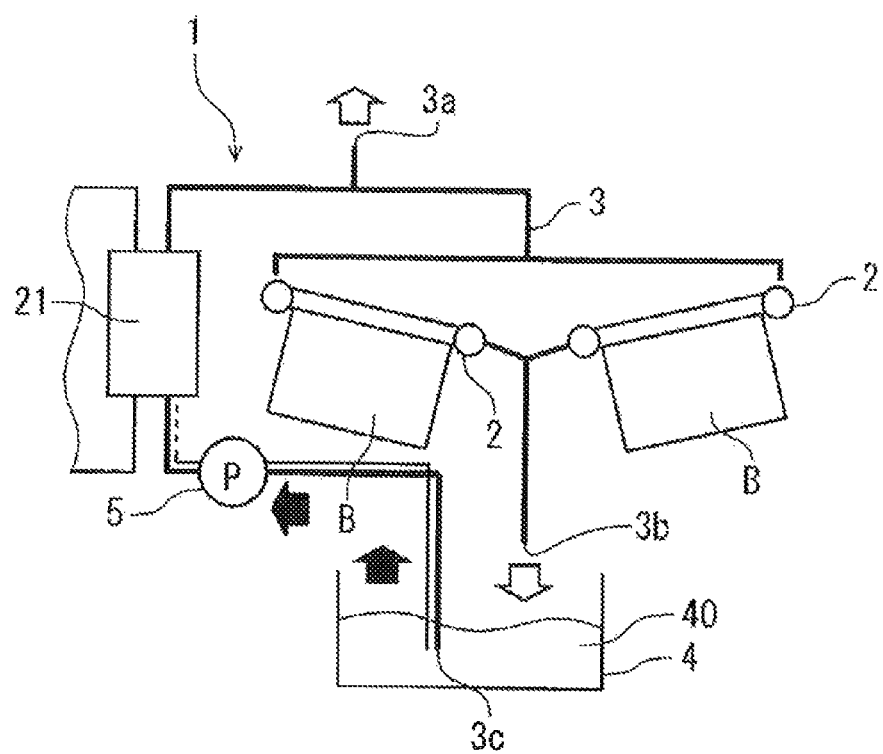
FIG. 7 is a structural diagram illustrating another example of the first heat exchange unit. (Embodiment 1)
Figure 8:
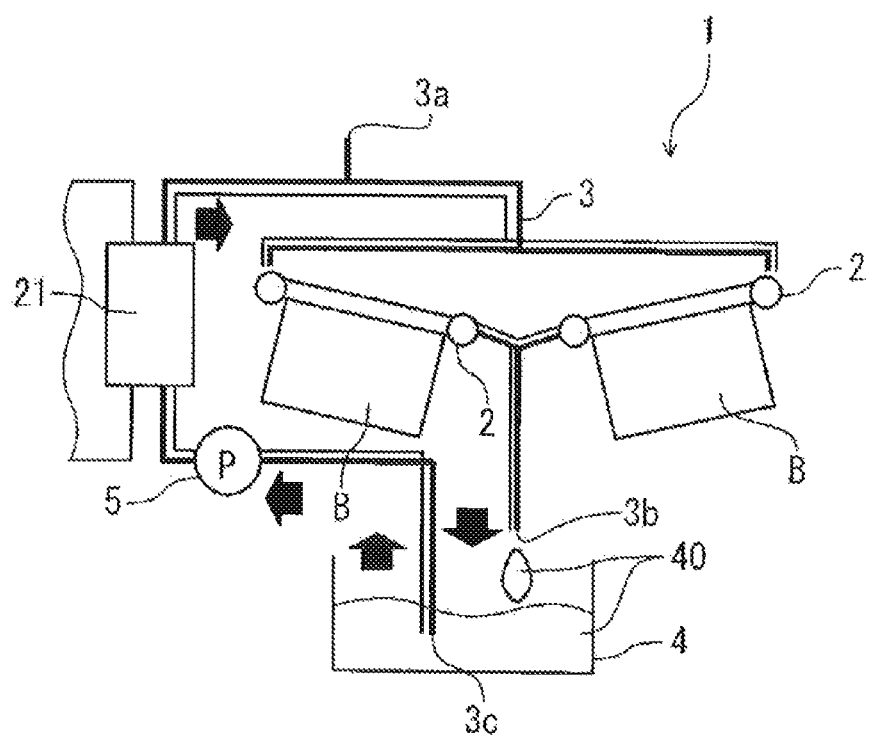
FIG. 8 is a structural diagram illustrating another example of the first heat exchange unit. (Embodiment 1)
Figure 9:
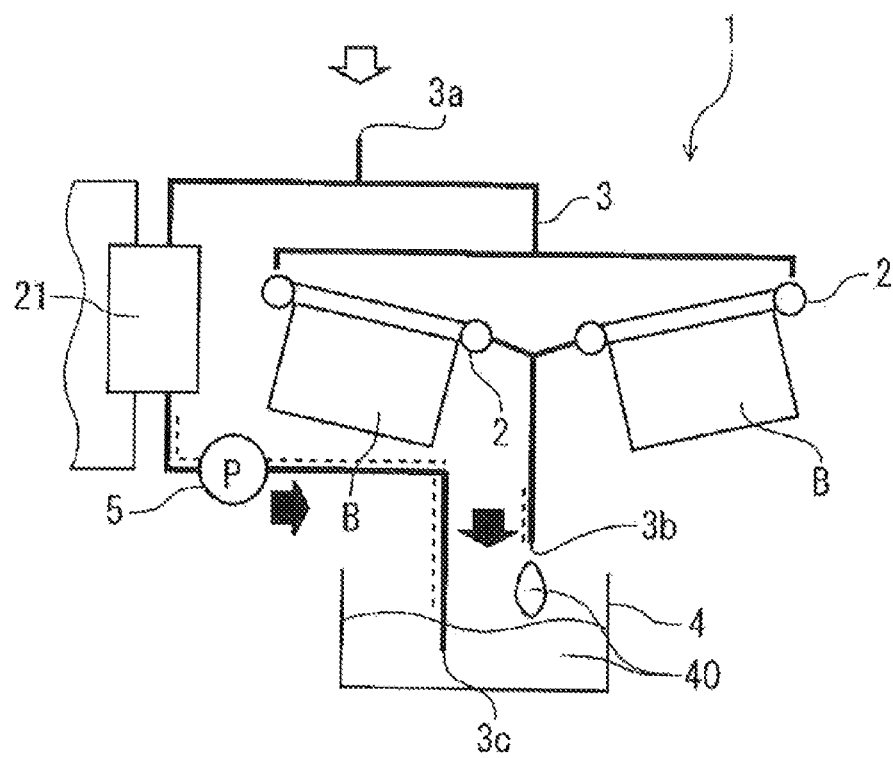
FIG. 9 is a structural diagram illustrating another example of the first heat exchange unit. (Embodiment 1)

The temperature control device of the battery illustrated in FIG. 7 to FIG. 9 has the same system structure as that of the temperature control device of the battery illustrated in FIG. 2 to FIG. 4. That is, in the temperature control device of this embodiment, the atmosphere communication port is provided at the upper portion of the first heat exchange unit 1, the heat medium storage portion 4 is provided at the location lower than the first heat exchange section 2, and when the battery is not charged, the heat medium 40 which exists in the first heat exchange section 2 is discharged from the first heat exchange section 2 to the heat medium storage portion 4.

This embodiment is similar to the former embodiment in that the atmosphere communication port 3a is provided at the uppermost portion of the pipe 3 and one opening 3b of the pipe 3 is positioned at the upper portion of the heat medium storage portion 4, but is different therefrom in that the other opening 3c of the pipe 3 is positioned at the upper portion of the heat medium storage portion 4. Accordingly, since the operation and the effect of the temperature control device of this embodiment are the same as those of the former embodiment, the description there of will be omitted here.

Then, in the case of the temperature control device of the battery illustrated in FIG. 7 to FIG. 9, since the other opening 3c of the pipe 3 is also positioned at the upper portion of the heat medium storage portion 4, detaching the heat medium storage portion 4 may be made further easily. Accordingly, when the heat medium storage portion 4 is detached when the battery is not charged, that is, the vehicle runs, the weight of the vehicle may be reduced.

Figure 10:
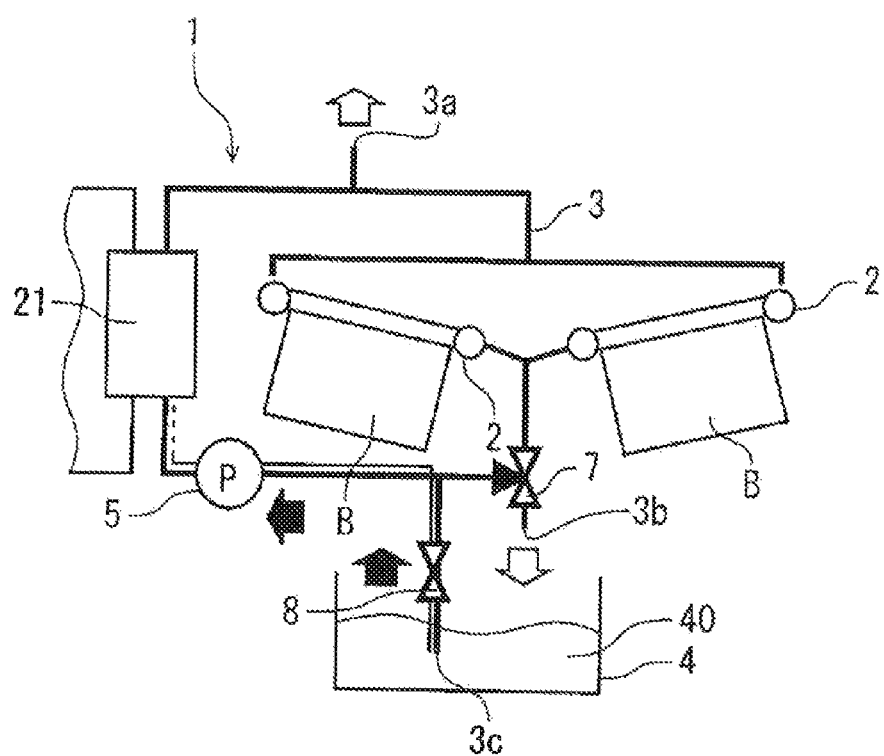
FIG. 10 is a structural diagram illustrating another example of the first heat exchange unit. (Embodiment 1)
Figure 11:
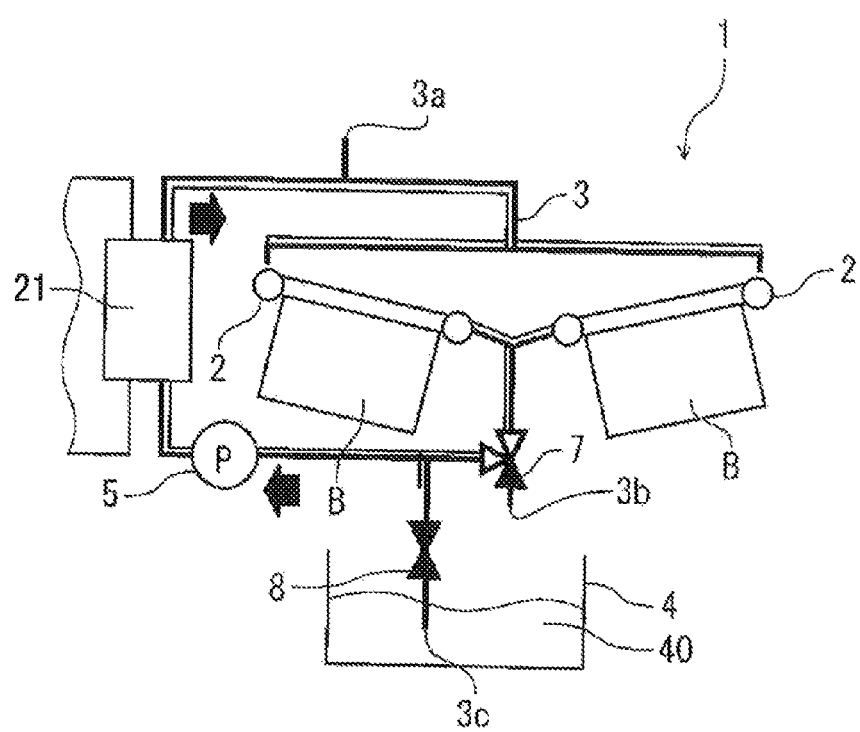
FIG. 11 is a structural diagram illustrating another example of the first heat exchange unit. (Embodiment 1)
Figure 12:
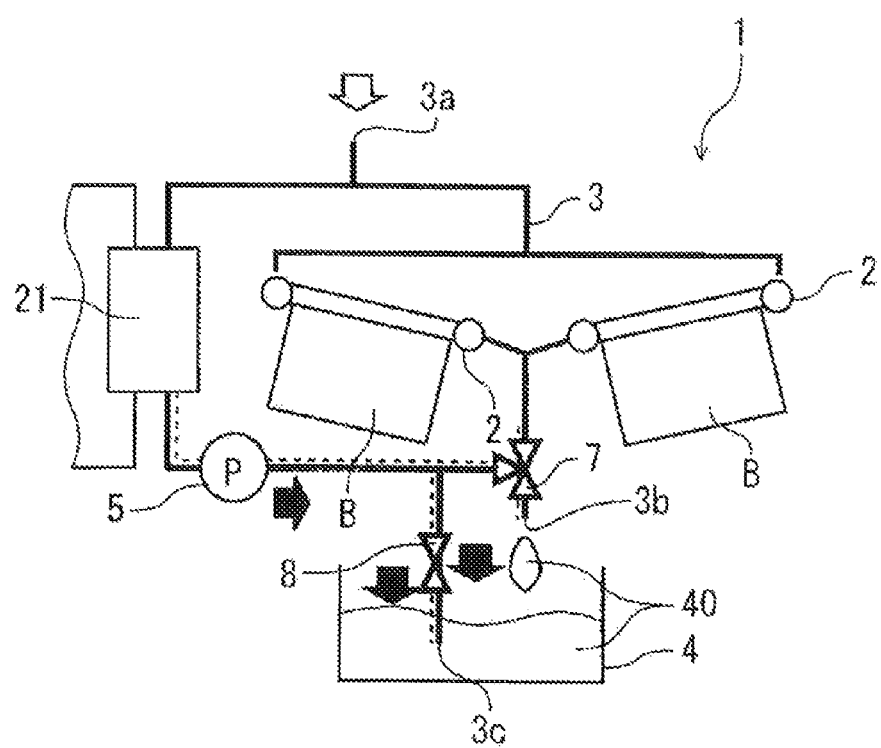
FIG. 12 is a structural diagram illustrating another example of the first heat exchange unit. (Embodiment 1)

The temperature control device of the battery illustrated in FIG. 10 to FIG. 12 has the same system structure as that of the temperature control device of the battery illustrated in FIG. 2 to FIG. 4 and FIG. 7 to FIG. 9. That is, in the temperature control device of this embodiment, the atmosphere communication port is provided at the upper portion of the first heat exchange unit 1, the heat medium storage portion 4 is disposed at the location lower than the first heat exchange section 2, and when the battery is not charged, the heat medium 40 which exists in the first heat exchange section 2 is discharged from the first heat exchange section 2 to the heat medium storage portion 4.

In this embodiment, the pipe 3 on the downstream side of the first heat exchange section 2 of the first heat exchange unit 1 is connected the pipe 3 on the upstream side of the pump 5, a three-way valve 7 is provided in the connected piping, one side of the three-way valve 7 is provided with a pipe having the opening 3b, a pipe having the opening 3c and directed toward the heat medium storage portion 4 is provided on the downstream side of the three-way valve so as to branch the piping, and an opening and closing valve 8 is provided in the vicinity of the opening 3c.

In the temperature control device of the battery illustrated in FIG. 10 to FIG. 12, the flow of the heat medium 40 before the battery is charged, at the time of charging the battery, and when the battery is not charged, is as follows.

Before the battery is charged, as illustrated in FIG. 10, only the opening 3b of the three-way valve 7 is opened and the opening and closing valve 8 is opened. Then, the heat medium 40 is suctioned from the opening 3c by the operation of the pump 5, and is introduced into the pipe 3. At this time, the air inside the pipe in front of the introduced heat medium 40 is discharged from the atmosphere communication port 3a. Then, the heat medium 40 fills the inside of the heat exchange core 6, and then fills the inside of the path up to the opening 3b.

After filling the pipe 3 will the heat medium 40, when the path to the opening 3b of the three-way valve 7 is blocked and the opening and closing valve 8 is blocked as illustrated in FIG. 11, the circulation cycle of the heat medium 40 is formed inside the unit.

As another embodiment of this structure, a structure may be adopted in which only the opening 3b of the three-way valve 7 is opened, the opening and closing valve 8 is opened, and the pump 5 is operated. In this case, the heat medium 40 reaches the first heat exchange section 2 through the heat medium storage portion 4, the opening and closing valve 8, the pump 5, and the second heat exchange section 21 so as to perform a heat exchange with the battery B, and is discharged to the heat medium storage portion 4 through the opening 3b. At this time, the heat medium 40 passes through the pipe 3 in the vicinity of the atmosphere communication port 3a, but since the atmosphere communication port 3a is provided at the uppermost portion of the pipe 3, the heat medium 40 may not be discharged from the atmosphere communication port 3a as in the case of the above-described respective embodiments.

When the battery is not charged, as illustrated in FIG. 12, the path of the opening 3b of the three-way valve 7 and the opening and closing valve 8 are opened, and the pump 5 is stopped or reversely operated, so that the heat medium 40 on the side of the first heat exchange section 2 is discharged from the opening 3b of the pipe 3 to the heat medium storage portion 4 and the heat medium 40 on the side of the pump 5 is discharged from the opening 3c of the pipe 3 to the heat medium storage portion 4. At this time, since the atmosphere communication port 3a is provided in the upper pipe 3 of the first heat exchange unit 1, air flows into the first heat exchange unit, that is, the pipe 3, so that the downward flow of the heat medium 40 to the heat medium storage portion 4 is accelerated as in the above-described respective embodiment.

In this way, in the temperature control device of the battery illustrated in FIG. 10 to FIG. 12, even in the case where the system is damaged due to the collision accident or the like of the vehicle as in the case of the above-described respective embodiments, since the heat medium 40 does not exist in the first heat exchange section, there is no fear at all for leakage of the heat medium 40, and the electric shock accident may be avoided.

Further, since the first heat exchange unit 2 is provided with the three-way valve 7 and the opening and closing valve 8, the circulation cycle of the heat medium 40 inside the unit may be formed by appropriately opening and closing these valves.

As described above, the invention may provided the battery temperature control device for the EV or the HEV capable of preventing the electric shock due to the electrical connection across the terminals of the batteries in the event of the vehicle collision in the liquid use system of this type of battery temperature control device.

Further, in the temperature control device of the battery according to the invention, the valve may be appropriately opened according to the object of the invention, in addition to the above-described respective embodiments. For example, the invention may be used for not only cooling the battery, also warming the battery.

That is, as for the use in the extremely cold region, there is a demand for increasing the temperature of the battery to an appropriate temperature and improving a discharge capability when the vehicle immediately starts to run after the charging is completed. As described above, the battery may generate heat when the battery is charged, but in the extremely cold region, there is a case in which the battery needs to be warmed due to the insufficient heating from the battery. In such a case, such a demand may be met by using hot water or the like as the heat medium 40 of this embodiment. Furthermore, in the second heat exchange unit, the condenser may be used as the evaporator in a manner such that the high-temperature and high-pressure refrigerant which is discharged from the compressor is made to flow into the second heat exchange section 2 so as to increase the temperature of the first heat exchange unit and is made to flow via the expansion valve.

Embodiment 2

Figure 13:
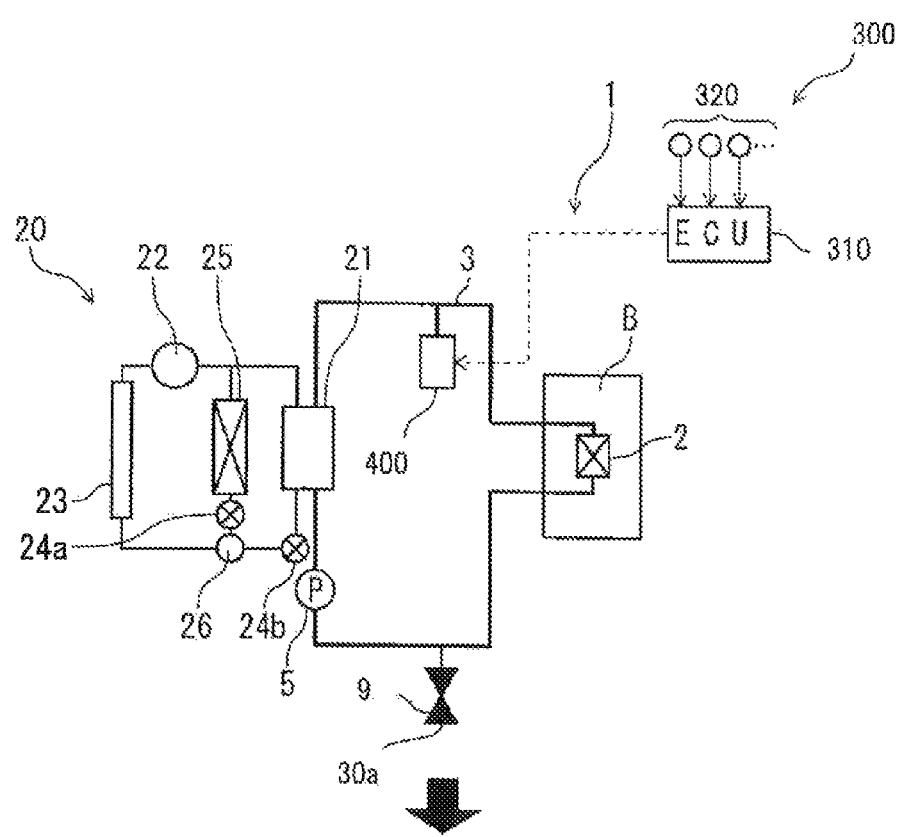
FIG. 13 is an overall structural diagram of the invention. (Embodiment 2)

FIG. 13 is and overall structural diagram illustrating a safety device of a temperature control system of this embodiment, and the safety device comprises the first heat exchange unit 1, the second heat exchange unit 20, a collision detecting unit 300 which detects an impact generated in the event of the vehicle collision and generated an impact signal, a compressed gas supply device 400 which discharges a compressed gas into the pipe 3 when the impact signal is generated, and a discharge portion 9 which is connected to the pipe 3 of the first heat exchange unit 1 and is able to discharge the heat medium pressed by the compressed gas to the outside of the pipe.

The first heat exchange unit 1 included the first heat exchange section 2 which is filled with a liquid-state heat medium into the pipe 3 and exchanges heat with the battery B by the heat medium. For the heat medium, for example, water or an antifreeze liquid is used, but the heat medium is not particularly limited thereto. Since the liquid-state heat medium is used, even when it is requested that the heat medium of the first heat exchange unit is temporarily taken out at the same time when the battery is replaced, the heat medium may be hardly evaporated into the atmosphere, and the replacement may be easily and safely performed. The second heat exchange unit 20 includes the second heat exchange section 21 which heats or cools the heat medium subjected to heat exchange in the first heat exchange section 2.

As for the first heat exchange unit 1, the compressed gas supply device 400 is connected to the upstream side of the first heat exchange section 2, the discharge portion 9 is provided on the downstream side of the first heat exchange section 2, and then provided with the pump 5 which circulates the heat medium inside the pipe 3. Furthermore, in this embodiment, the discharge portion 9 is provided below the first heat exchange section 2.

The second heat exchange unit 20 includes the second heat exchange section 21 as described above, and included the compressor 22 which compresses the refrigerant, the condenser 23 which cools the refrigerant compressed in the compressor 22, the depressurizer 24a which depressurizes and expands the refrigerant cooled in the condenser 23, and the evaporator 25 which evaporates the refrigerant depressurized in the depressurizer 24a. Furthermore, the compressor 22 is driven by a motor (not illustrated). Further, for the refrigerant which is used in the second heat exchange unit, fleon, carbon dioxide, hydrocarbon, or the like is appropriately used.

In FIG. 13, numeral 26 is the switching valve, and the temperature control in the second heat exchange section 21 may be performed by the switching of the switching valve 26. Accordingly, since the temperature control of the battery B in the first heat exchange section 2 may be also performed by the temperature control, the temperature of the battery is maintained in an appropriately constant state, so that the efficiency of charging and discharging the battery may be improved.

For example, when the refrigerant which is discharged from the compressor 22 and passes through the condenser 23 is made to flow into the second heat exchange section 21 by the switching valve 26, the refrigerant may be depressurized in the depressurizer 24b on the upstream side of the second heat exchange section 21, evaporated in the second heat exchange section 21 so as to cool the heat exchange unit 1, and then returned to the compressor 22. Furthermore, by appropriately changing the discharge amount of the refrigerant from the compressor 22 or changing the setting condition of the depressurizer 24b on the upstream side of the second heat exchange section 21, the cooling amount of the first heat exchange unit 1 in the second heat exchange section 21 may be controlled. These points are similar to those of Embodiment 1.

Further, if necessary, the refrigerant which is discharged from the compressor 22 and passes through the condenser 23 may be distributed to both the second heat exchange section 21 and the evaporator 25 by the switching valve 26.

As described above, the collision detecting unit 300 is an electronic control unit (hereinafter, referred to as an 'ECU') 310, which is the impact detecting means that detects an impact generated in the event of the vehicle collision and generates an impact signal, and comprising a microcomputer (CPU), a timer circuit, a memory, and the like, and receives input of detection signals of various sensor groups 320 which detect the driving status or the like of the vehicle. The sensor groups 320 are provided with a collision detecting sensor which detects the collision of the vehicle. The ECU 310 performs a predetermined computation process based on the input signals, and is structured to output a control signal to the compressed gas supply device 400 in this embodiment.

The compressed gas supply device 400 includes, for example, a compressed gas cylinder, and is connected to the pipe 3 through an electromagnetic valve (not illustrated). The electromagnetic valve is so structured that it is normally blocked but opened by the control signal from the ECU 310, thereby to discharge the compressed gas into the pipe 3.

In the case of this embodiment, the discharge portion 9 is so structured that when the pressure inside the pipe 3 exceeds a predetermined value (a valve opening pressure threshold value), a presser valve is opened. Then, as described above, when the compressed gas is discharged from the compressed gas supply device 400, and the pressure inside the pipe 3 exceeds the valve opening pressure threshold value, the discharge portion 9 is opened so that the heat medium is discharged to the outside of the pipe. Furthermore, in the drawing, numeral 30a is the opening of the pipe 3.

In the safety device of the battery temperature control system of FIG. 13 with the above-described structure, when the collision detecting unit 300 detects an impact, the collision detecting unit generates an impact signal to the compressed gas supply device 400. In the case of this embodiment, the ECU 310 outputs a control signal to the compressed gas supply device 400, and based on this signal, the compressed gas supply device 400 discharges the compressed gas. When the compressed gas is charged into the pipe 3, the inner pressure of the pipe rises sharply, the heat medium, which is existing particularly in the downstream-side first heat exchanged section 2, is pressurized and caused to forcedly flow downward, where upon the heat medium is discharged from the discharge portion 9 to the outside of the pipe.

In this way, when the vehicle receives an impact, the heat medium existing in the first heat exchange section is discharged from the discharge portion to the outside of the pipe due to the compressed gas which is discharged from the compressed gas supply device, so that even in the case where the system of the EV or the HEV is damaged due to the collision accident or the like, there is no fear at all for leakage of the heat medium from the first heat exchange section. Accordingly, the electric shock accident, which may be caused when the heat medium leaks from the first heat exchange section, can be avoided.

Further, in the case of this embodiment, the compressed gas supply device is disposed on the upstream side of the first heat exchange section, and the discharge portion is provided on the downstream side of the first heat exchange section. Accordingly, it is possible to prevent the heat medium from remaining inside the cycle as much as possible, and more reliably avoid the electric shock accident.

Figure 14:
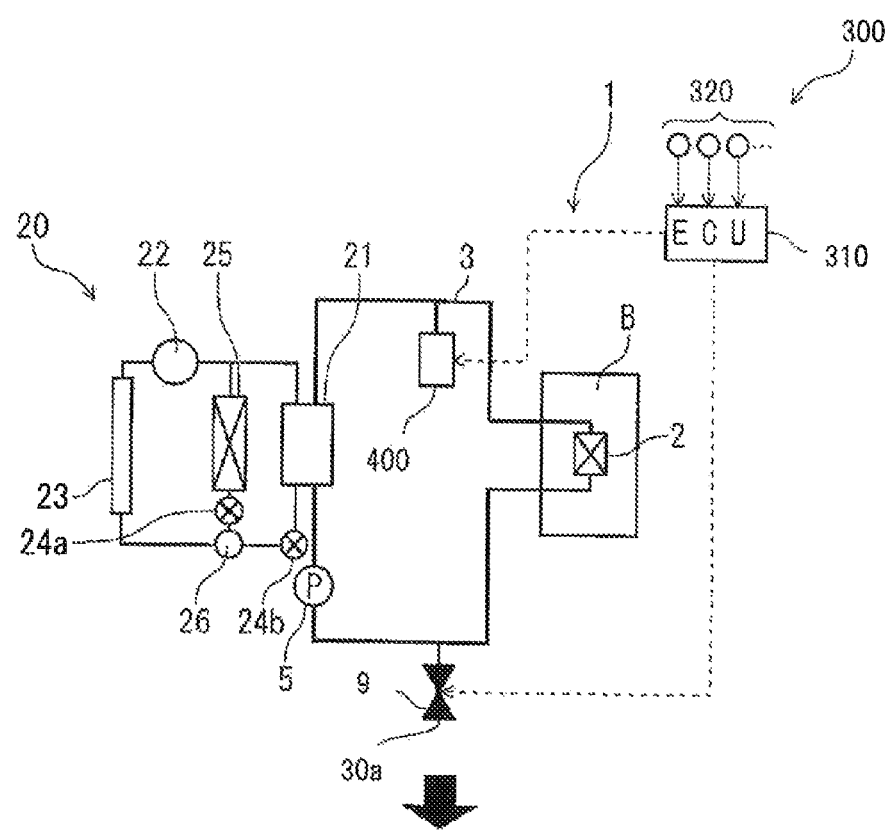
FIG. 14 is an overall structural diagram of the invention. (Embodiment 2)

In the safety device of the battery temperature control system illustrated in FIG. 14, the discharge portion 9 is structured of the electromagnetic valve. That is, the discharge portion 9 is an electromagnetic valve which is opened when the impact signal is generated, and by this opening operation the heat medium is discharged to the outside of the pipe.

Accordingly, in the embodiment illustrated in FIG. 14, when the impact signal is generated, the compressed gas is discharged from the compressed gas supply device, and the discharge portion 9, which is the electromagnetic valve, is opened to be in the opened state. Accordingly, the heat medium which exists in the first heat exchange section 2 is discharged from the discharge portion 9 to the outside of the pipe by the compressed gas.

Therefore, as in the case of the former embodiment, the electric shock accident, which may be caused when the heat medium leaks from the first heat exchange section, can be avoided.

Figure 15:
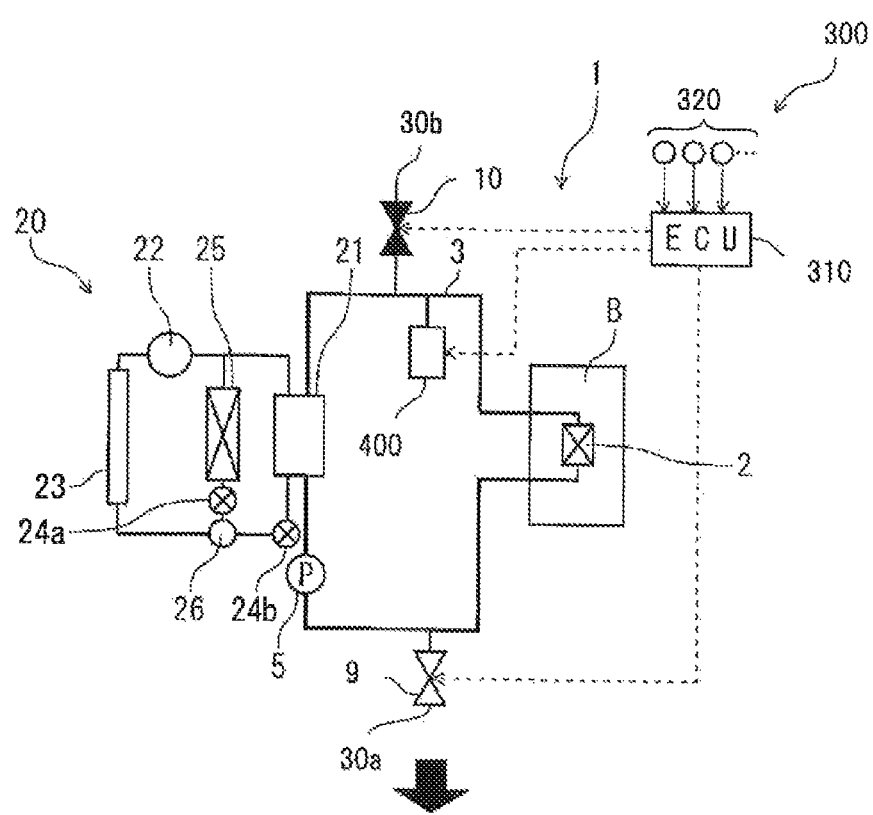
FIG. 15 is an overall structural diagram of the invention. (Embodiment 2)
Figure 16:
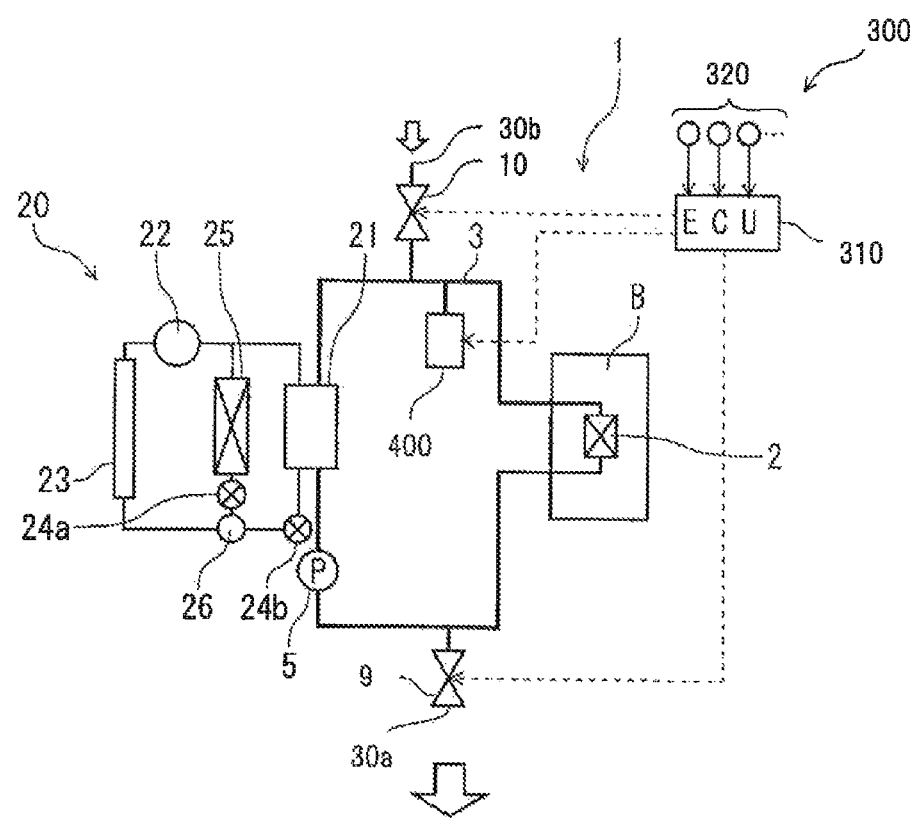
FIG. 16 is an overall structural diagram of the invention. (Embodiment 2)

In the safety device of the battery temperature control system illustrated in FIG. 15 and FIG. 16 is structured such that, in addition to the device of FIG. 14, an atmosphere communication port 30b is provided in the upper pipe 3 of the first heat exchange unit 1, and an opening and closing valve 10, which opens and closes the atmosphere communication port 30b, is provided. Furthermore, the same numerals will be given to the constituting elements which are common to those of the case of FIG. 13 and FIG. 14, and hereinafter, the detailed description thereof will be omitted.

In the safety device of the battery temperature control system of this embodiment, the atmosphere communication port 30b is provided in the upper pipe 3 of the first heat exchange unit 1, and the electromagnetic valve is used for the opening and closing valve 10. Then, this opening and closing valve is structured to be opened and closed by the control signal from the ECU 310 similar to the electromagnetic valve of the discharge portion 9.

In this embodiment, the opening and closing valve 10 is normally closed and opened after the lapse of a predetermined time from the generation of the impact signal from the collision detecting unit 300. Furthermore, the discharge portion 9 is provided at the location lower than the first heat exchange section 2 as in the case of the above-described embodiment.

Figure 17:
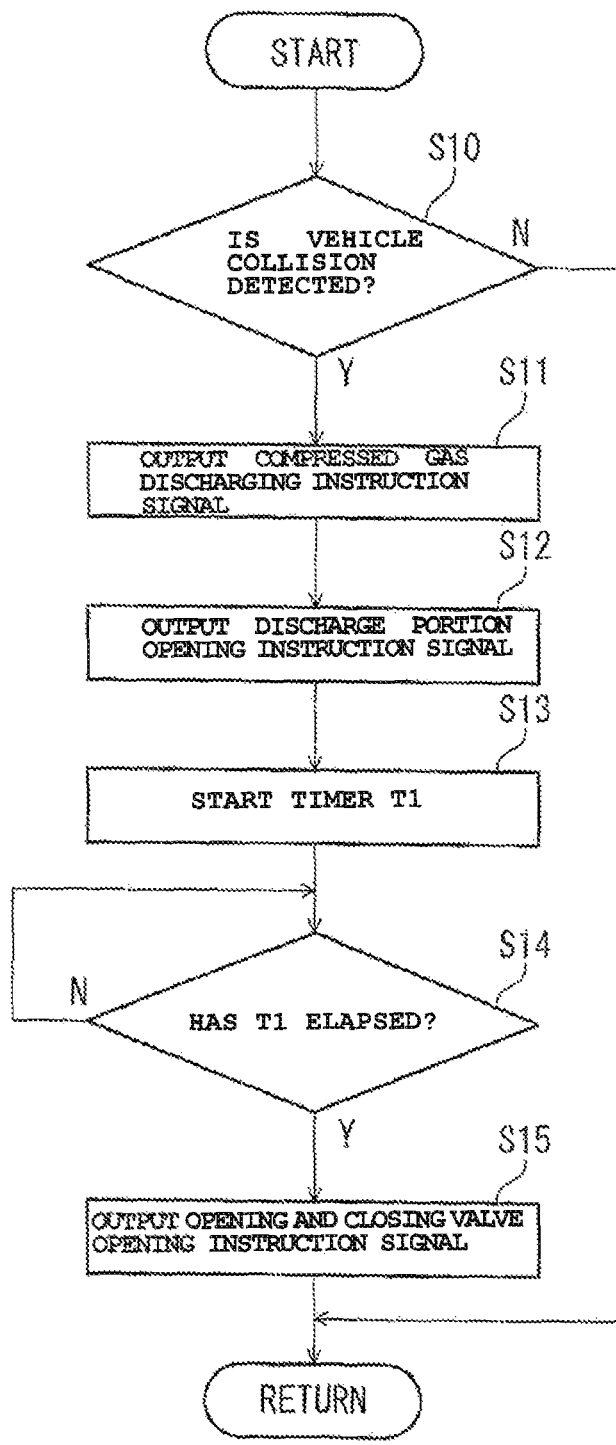
FIG. 17 is a diagram illustrating a flowchart of the invention. (Embodiment 2)

FIG. 17 is a flowchart illustrating the operation of the safety device of this embodiment. First, as illustrated in S10 of FIG. 17, the ECU 310 determines whether the vehicle collision occurs. This determination is made according to the presence of various collision signals which are input to the ECU 310. When it is determined that the vehicle collision does not occur, the control process is ended. On the other hand, when it is determined that the vehicle collision occurs, a compressed gas discharging instruction signal is output to the compressed gas supply device 400 (S11), and a discharge portion opening instruction signal is output to the discharge portion 9 (S12). At the same time counting of the time T1 is started by the timer circuit (S13). The time T1 is a time which is set in advance in the ECU 310, and is set to, for example, any time between 10 to 30 seconds.

Then, the process shifts to S14, and it is determined whether the time T1 has elapsed. When it is determined that the time T1 has not elapsed, the process returns to S14. On the other hand, when it is determined that the time T1 has elapsed, the opening and closing valve opening instruction signal is output to the opening and closing valve 10 (S15), and the opening and closing valve 10 is opened.

As described above, since the atmosphere communication port 30b is provided in the upper pipe 3 of the first heat exchange unit 1, when the opening and closing valve 10 is opened, air flows into the first heat exchange unit, that is, the pipe, so that the downward flow of the heat medium remaining in the first heat exchange section by the own weight, is accelerated.

According to the safety device of this embodiment, even after the discharge operation using the compressed gas from the compressed gas supply device is performed, since the downward flow of the medium from the discharge portion by the own weight, is accelerated the electric shock accident may be more reliably avoided.

As described above, according to the safety device of the battery temperature control system of the respective embodiments, even in the case where the system is damaged due to the collision accident or the like, since the heat medium does not exist in the first heat exchange section, there is no fear at all for leakage of the heat medium, thereby the electric shock accident can be avoided.

Furthermore, the safety device of the battery temperature control system according to the invention may be appropriately modified in accordance with the object of the invention, in addition to the above-described respective embodiments. For example, the above-described ECU is generally used in the vehicle provided with the airbag, the existing ECU may be used in the invention.

Further, the second heat exchange unit may be structured such that the refrigerant which is discharged from the compressor 22 is made to flow toward the second heat exchange section, and to sequentially pass through the expansion valve 24b, the switching valve 26, and the condenser 23, thereby the thermal refrigerant charged in the first heat exchange unit may be warmed. Switching of the direction in which the refrigerant is discharged from the compressor 21 may be made by the known method, such as, reversely rotating the operation direction of the compressor 21, changing the arrangement of the compressor inside the second heat exchange unit while making the operation direction of the compressor 21 constant, or setting the flow passageway switching paths (which are not illustrated).

INDUSTRIAL APPLICABILITY

The invention is suitable for the liquid use system in the battery temperature control device for an EV or an HEV.

DESCRIPTION OF REFERENCE NUMERALS AND SYMBOLS

1 FIRST HEAT EXCHANGE UNIT
2 FIRST HEAT EXCHANGE SECTION
20 SECOND HEAT EXCHANGE UNIT
21 SECOND HEAT EXCHANGE SECTION
22 COMPRESSOR
23 CONDENSER
24a DEPRESSURIZER
24b DEPRESSURIZER
25 EVAPORATOR
26 SWITCHING VALVE
3 PIPE
3a ATMOSPHERE COMMUNICATION PORT
3b OPENING
3c OPENING
30a OPENING
30b ATMOSPHERE COMMUNICATION PORT
4 HEAT MEDIUM STORAGE PORTION
40 HEAT MEDIUM
5 PUMP
6 HEAT EXCHANGE CORE
7 THREE-WAY VALVE
8 OPENING AND CLOSING VALVE
9 DISCHARGE PORTION
10 OPENING AND CLOSING VALVE
300 COLLISION DETECTING UNIT
310 ELECTRONIC CONTROL UNIT (ECU)
320 SENSOR GROUP
400 COMPRESSED GAS SUPPLY DEVICE
B BATTERY

The invention claimed is:
1. A safety device of a battery temperature control system comprising:
a first heat exchange unit (1) which includes a first heat exchange section (2) filled with liquid-state heat medium (40) into a pipe (3) and exchanging heat with a battery (B) by the heat medium (40);

a second heat exchange unit (20) which includes a second heat exchange section (21) heating or cooling the heat medium (40) subjected to heat exchange in the first heat exchange section (2);

a collision detecting unit (300) which detects an impact in the event of a vehicle collision and generates an impact signal;

a compressed gas supply device (400) which is connected to the pipe (3) of the first heat exchange unit (1) and discharges a compressed gas into the pipe (3) when the impact signal is generated; and a discharge portion (9) which is connected to the pipe (3) of the first heat exchange unit (1) and is able to discharge the heat medium (40) charged into the pipe (3) to the outside of the pipe (3), the heat medium (40) existing in the first heat exchange section (2) being discharged to the outside of the first heat exchange section (2) under a predetermined condition which is when the collision detecting unit (300) detects the impact, the heat medium (40) existing in the first heat exchange section (2) being discharged from the discharge portion (9) to the outside of the pipe (3) by the compressed gas discharged from the compressed gas supply device (400).

2. The safety device of the battery temperature control system according to claim 1, wherein the compressed gas supply device (400) is disposed on the upstream side of the first heat exchange section (2), and the discharge portion (9) is disposed on the downstream side of the first heat exchange section (2).

3. The safety device of the battery temperature control system according to claim 1, wherein the discharge portion (9) is a pressure valve which is opened when the inner pressure of the pipe (3) exceeds a predetermined value, and by this opening operation, the heat medium (40) is discharged to the outside of the pipe (3).

4. The safety device of the battery temperature control system according to claim 1, wherein the discharge portion (9) is an electromagnetic valve which is opened when the impact signal is generated, and by this opening operation, the heat medium (40) is discharged to the outside of the pipe (3).

5. The safety device of the battery temperature control system according to claim 1, wherein an atmosphere communication port is provided at the upper portion of the first heat exchange unit (1), an opening and closing valve, which opens and closes the atmosphere communication port, is provided, the discharge portion (9) is disposed in at least the lower portion of the first heat exchange section (2), and the opening and closing valve is opened after the lapse of a predetermined time from the generation of the impact signal from the collision detecting unit (300).

6. The safety device of the battery temperature control system according to claim 1, wherein the first heat exchange unit (1) includes a heat medium storage portion and a pump circulating the heat medium (40) of the heat medium storage portion within the pipe (3).

7. The safety device of the battery temperature control system according to claim 6, wherein the first heat exchange section (2) of the first heat exchange unit (1) is connected to the second heat exchange section (21) by a pipe, a three-way valve is provided in the connected pipe, one side of the three-way valve is provided with a pipe having a first opening directed toward the heat medium storage portion, a pipe having a second opening directed toward the heat medium storage portion is provided in either the upstream or the downstream portion of the three-way valve so as to branch the pipe, and an opening and closing valve is provided in the vicinity of the second opening.

8. The safety device of the battery temperature control system according to claim 6, wherein the heat medium storage portion is detachably mounted.

\* \* \* \* \*